Sept. 15, 1931.  G. H. HART  1,823,099
THERMOSTATICALLY OPERATED SWITCH MECHANISM
Filed April 18, 1929
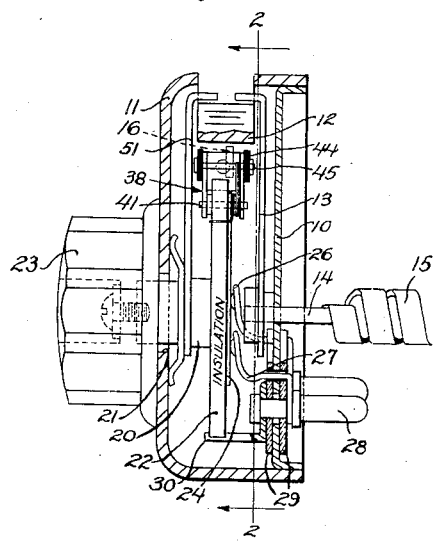
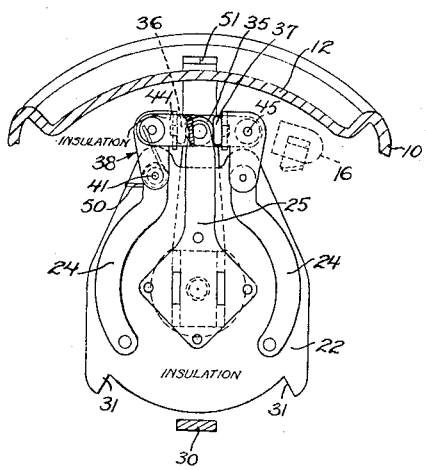
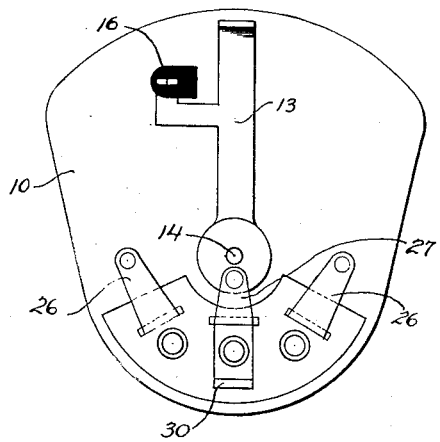
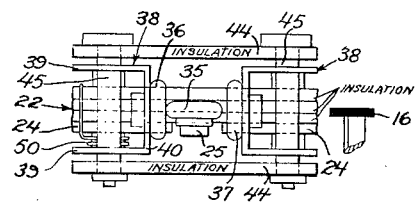
Inventor
George Hegeman Hart
his Attorney Patented Sept. 15, 1931

1,823,099

UNITED STATES PATENT OFFICE

GEORGE HEGEMAN HART, OF WEST HARTFORD, CONNECTICUT

THERMOSTATICALLY OPERATED SWITCH MECHANISM

Application filed April 18, 1929. Serial No. 356,021.

This invention relates to a device including a thermostatically operated switch which may be adjusted to throw the current on and off at predetermined temperatures, the device preferably having indicating means operated by a thermostatic element for indicating the temperature of the apparatus which is to be controlled. As an instance of a use to which the device of the present invention may be applied, reference may be had to the controlling and indicating of the temperatures of an electrically heated oven or the like. It is to be understood, however, that the present invention is not limited to this one application.

The aim of the invention is to provide a device of this sort having various features of novelty and advantage and which is characterized by its simplicity in construction, its effectiveness in operation, and the ease and facility with which it may be adjusted.

Other objects will be in part obvious and in part pointed out more in detail hereinafter.

The invention accordingly consists in the features of construction, combination of elements and arrangement of parts which will be exemplified in the construction hereinafter set forth and the scope of the application of which will be indicated in the appended claims.

In the accompanying drawings, wherein I have shown, for illustrative purposes, one embodiment which the present invention may take, Figure 1 is a side elevational view of my improved device, the casing thereof being shown in central section;

Fig. 2 is a view looking at the rear side of the adjustable switch unit, this view being taken substantially on line 2—2 of Fig. 1, and looking in the direction of the arrows;

Fig. 3 is a front view of the back or base plate of the casing, the parts being viewed along the line 2—2 of Fig. 1, but in a direction opposite to the arrows associated with that line; and Fig. 4 is an enlarged detailed view showing, in top plan, the contacts, the members carrying the same, and the switch actuating finger.

Referring to the drawings in detail, 10 designates a base plate of a casing and 11 a cap of suitable configuration. The cap 11 has a portion of its wall pressed inwardly, as at 12, and the outer face of this portion bears a scale for indicating temperatures. Cooperating with this scale is a pointer 13 carried on the forward end of a shaft 14 projecting through, and having a bearing in, the base plate 10. This shaft, together with the pointer carried thereby, is adapted to be turned by a suitable thermostatic device or element which may be in the form of a thermostatic coil 15. The thermostatic element or coil is not shown in detail, as, obviously, the construction and type thereto may be varied to suit conditions. The thermostatic coil is adapted to be positioned within an oven or other device, the heat of which is to be controlled. When the temperature of the oven rises, the coil will turn the pointer 13 in one direction over the scale, and when the temperature falls, the pointer will be moved in the opposite direction over the scale. Carried by the pointer, in any suitable manner, is a switch actuating piece or finger 16, which is of insulating material.

Mounted within the casing for angular adjustment is a switch unit having a bearing member 20 mounted in an opening 21 in the front wall of the casing. Fixed to the inner end of this bearing member is a multi-ply plate 22 of insulating material, and fixed to the outer end of the bearing member is a knob or handle 23, by means of which the switch unit may be adjusted. Carried on the rear face of the insulating plate 22, are two side conductors 24 and a central conductor 25, the side conductors being somewhat of arcuate shape. Carried by, and insulated from, the base plate 10 are two spring fingers 26 adapted to respectively engage the rear faces of the contacts 24. Also carried by, and insulated from, the base plate is a central spring finger 27 adapted to engage the central conductor 25. The spring fingers are secured in place by plugs 28 which are insulated from the plate 10 by insulating strips or sheets 29. Secured in place by the central plug 28 is a stop or bracket 30 which is adapted to cooperate with stop shoulders 31 on the insulating plate 22 so as to limit the extent of angular adjustment of switch unit.

In accordance with the present invention, there is fixed to the central conductor, a contact member; and pivotally connected to the side conductors and connected together so as to move in unison, are a pair of contacts which are adapted to be alternately engaged with the fixed central contact. These contacts in the present illustrative disclosure of the invention are shown as being in the form of buttons or discs, the fixed contact being designated by the numeral 35 and the movable ones by the numerals 36 and 37, respectively. The fixed contact may be riveted or otherwise secured to the upper end of the central conductor 25. The side contacts are respectively carried by pivoted members or pieces 38, 38 which are preferably formed of sheet metal by stamping out blanks of the desired configuration and then bending the blanks to the shape shown. Each of these pivoted members has a pair of side webs or arms 39, and a cross portion 40 which carries a respective contact 36 or 37. The arms 39 straddle the upper end of the insulating plate 22 and are pivoted thereto by pins 41. The pins 41 pass through and snugly fit in openings in the upper ends of the conductors 24 so that the arms have an electrical connection with the conductors. The contact carrying pieces are connected together, so that they will move in unison, by means of links 44 of insulated material. These links are pivotally connected to the arms by means of pintles 45. The pantographic assembly, which includes the pivoted members 38 and the links 44, is normally urged in one direction so as to resiliently maintain the contact 36 in engagement with the fixed contact 35, and to this end there is provided a spring 50 coiled about one of the pins 41. One end of the spring is bent about an edge of the insulating plate 22, and the other end of the plate engages a pintle 45. The switch actuating finger 16 moves in an arc which includes the right hand pintle 45, and the finger is adapted to engage that pintle.

Angularly adjustable with the switch unit is a pointer 51 for indicating the adjusted position of the switch unit. In the present illustrative disclosure this pointer is carried by the stem 20 and has its free end bent rearwardly so as to overlie the scale on the portion 12. Between the pointer and the front wall of the casing is a spring which resiliently holds stem 20, and the parts carried thereby, against end play.

When the parts are assembled, as shown in Figure 1, the contact fingers 26 respectively engage and wipe against the curved conductors 24, and the central spring finger 27 engages the central conductor 25. The plugs 28 are adapted to be inserted into suitable terminals provided on the range, and these terminals may be electrically connected to suitable operating means such as a relay device which in turn may be associated with the switches of the oven. It may be assumed that the contact 36 is the "on" one; that is to say, when the current is passing therethrough heat is on the oven. Then the contact 37 is the "off" one; that is to say, when the contact 37 is in engagement with the contact 35, the relay is operated to throw the oven switch or switches into off position.

The temperature to which the oven or other mechanism is to be heated, having been determined, the knob 23 will be turned until the pointer 51 comes opposite that mark on the scale which indicates the desired temperature. When the heat is first thrown onto the oven, the thermostatic element 15 is cold so that the switch finger 16 is spaced from the right hand pintle 45, referring to Fig. 2. As the heat of the oven rises, the pointer 13 will gradually be moved to the left until, when the oven reaches the desired temperature, the switch finger 16 is brought into engagement with that pintle, thereby moving the pivoted pieces 38 to the left so that the "on" contact 36 is moved away from the central contact 35, and the "off" contact 37 is brought into engagement with the central fixed contact 35. When this occurs the relay device is tripped so as to turn the current off of the oven. The oven will now cool down with the result that the thermostatic element will move the switch finger 16 away from the pintle which it has been engaging, and then the spring 50 will rock the pantographic assembly, including the links 44, to the right. Thus the "off" contact is moved away from, and the "on" contact is moved into engagement with the central contact 35, so that the relay will again trip, with the result that the current will be thrown on to the oven. Thus it will be seen that the oven is maintained substantially at the desired temperature.

It will be observed from the foregoing description, taken in connection with the accompanying drawings, that my improved arrangement is very simple in construction and effective in operation.

As many changes could be made in the above construction and many apparently widely different embodiments of this invention could be made without departing from the scope thereof, it is intended that all matter contained in the above description, or shown in the accompanying drawing, shall be interpreted as illustrative and not in a limiting sense.

It is also to be understood that the language used in the following claims is intended to cover all of the generic and specific features of the invention herein described, and all statements of the scope of the invention which, as a matter of language, might be said to fall therebetween.

I claim as my invention:

1. In a thermostatically operated switch mechanism, a thermostatic element, a pointer operated thereby for indicating temperatures; an angularly adjustable switch unit including a pair of pivoted contacts and a contact therebetween, said pivoted contacts being connected together to move in unison, and means for normally urging said pivoted contacts in a direction to engage one of them with the central contact; a member on said pointer adapted to move said movable contacts so as to disengage one and engage the other with said central contact, a pointer associated with said switch unit for indicating the setting thereof, and means for adjusting said unit.

2. In a thermostatically operated switch mechanism, a thermostatic element, a pointer operated thereby for indicating temperatures; an angularly adjustable switch unit including a pair of side conductors, a central conductor, a contact fixedly carried by the central conductor, a contact pivoted and electrically connected to each side conductor, an insulating connection between said pivoted contacts, and a spring normally urging said pivoted contacts in a direction to engage one of them with the fixed contact; means actuated by said thermostatic element and adapted to move said pivoted contacts against the pressure of said spring, and means for adjusting said unit.

3. In a thermostatically operated switch mechanism, a thermostatic element, a pointer operated thereby for indicating temperatures; an angularly adjustable switch unit including a plate of insulating material, a central conductor thereon, a conductor to each side of said central conductor, a contact fixed to said central conductor, a piece pivoted to and in conducting relation with each side conductor, a contact carried by each pivoted piece, a connecting link between said pivoted pieces whereby the same move in unison, and a spring normally urging said pivoted pieces in a direction to engage one of said pivoted contacts with said fixed contact; a pointer operated by said thermostatic element for indicating temperatures and having a member adapted to engage one of said pivoted pieces and means for adjusting said unit.

GEORGE HEGEMAN HART.